United States Patent
Zhao (10) Patent No.: US 10,993,300 B1
(45) Date of Patent: Apr. 27, 2021

(54) LOW POWER CONSUMPTION LED CONSTANT CURRENT DRIVE CIRCUIT

(71) Applicant: SI EN TECHNOLOGY (XIAMEN) LIMITED, Xiamen (CN)

(72) Inventor: Dongshi Zhao, Xiamen (CN)

(73) Assignee: SI EN TECHNOLOGY (XIAMEN) LIMITED, Fujian (CN)

( * ) Notice: Subject to any disclaimer, the term of this patent is extended or adjusted under 35 U.S.C. 154(b) by 0 days.

(21) Appl. No.: 16/889,758

(22) Filed: Jun. 1, 2020

(30) Foreign Application Priority Data

Apr. 9, 2020 (CN) .......................... 202010274235.5

(51) Int. Cl.
*H05B 45/345* (2020.01)
*H05B 45/395* (2020.01)
*H05B 45/37* (2020.01)
*H05B 45/10* (2020.01)
*H05B 45/50* (2020.01)

(52) U.S. Cl.
CPC ................................ *H05B 45/345* (2020.01)

(58) Field of Classification Search
CPC ...... H05B 45/395; H05B 45/37; H05B 45/10; H05B 45/14; H05B 45/46; H05B 45/48; H05B 45/50; H02M 2003/1586; H02M 3/158; H02M 3/1584
USPC ............. 315/210, 127, 160, 163, 172, 185 R
See application file for complete search history.

(56) References Cited

U.S. PATENT DOCUMENTS

2007/0296353 A1\* 12/2007 Ito .......................... H02M 3/156
                                                                    315/307

\* cited by examiner

*Primary Examiner* — Wei (Victory) Y Chan
(74) *Attorney, Agent, or Firm* — Leong C. Lei (57) ABSTRACT

A low power consumption LED constant current drive circuit includes a power source input circuit, a constant current source circuit, an output voltage detection circuit, and a reference current control circuit, having the advantage of lower power consumption.

5 Claims, 5 Drawing Sheets

LOW POWER CONSUMPTION LED CONSTANT CURRENT DRIVE CIRCUIT

BACKGROUND OF THE INVENTION

1. Field of the Invention

The present invention relates to an LED drive circuit, and more particularly to a low power consumption LED constant current drive circuit.

2. Description of the Prior Art

Figure 1:
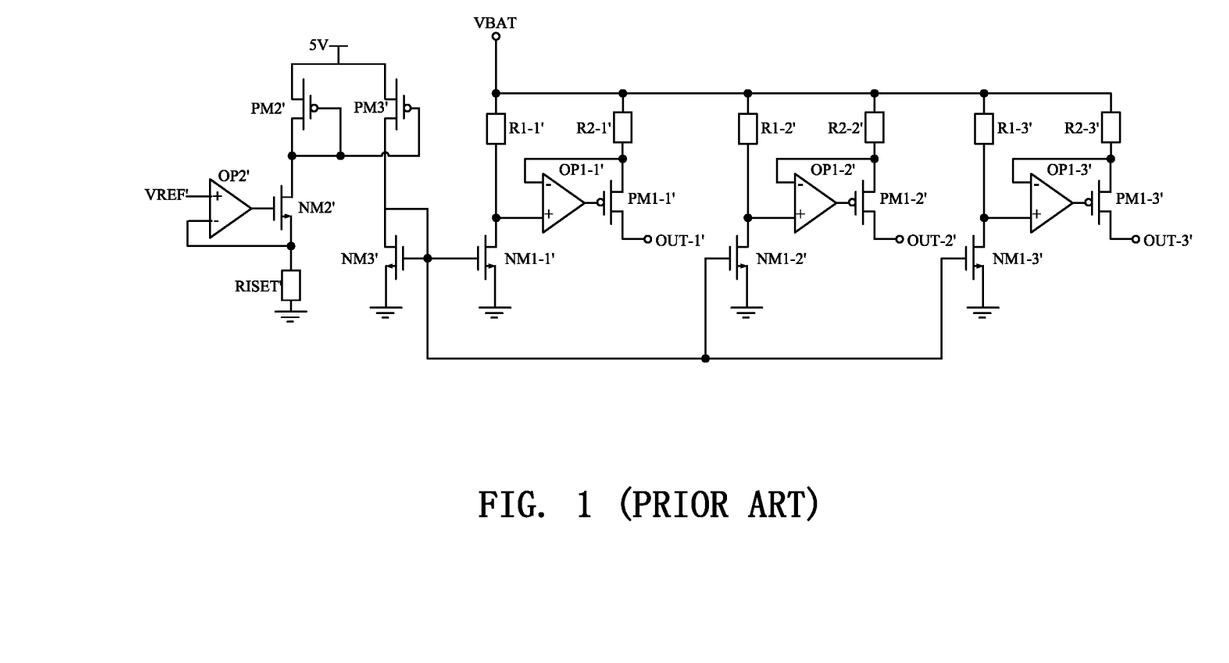
FIG. 1 is a circuit diagram of a conventional multi-channel constant current drive circuit.

An LED is a solid-state semiconductor device that can directly convert electricity into light. The inherent characteristics of the LED determine that it is the most ideal light source to replace the traditional light source, and it is widely used. In addition to meeting the safety requirements, the other basic functions the LED drive circuit should have two aspects: One is to keep the constant current characteristics as much as possible, especially when the power source voltage fluctuates by ±15%, the output current should be able to fluctuate within ±10%; Second, the drive circuit should keep its own power consumption low, so that the efficiency of the LED system can be maintained at a high level. However, the existing multi-channel constant current drive circuit for driving multi-channel LED loads still has the problem of high power consumption ratio. Its own power consumption may be equal to the power consumption of the LED load. The high power consumption ratio of the multi-channel constant current drive circuit means that the chip encapsulated by the multi-channel constant current drive circuit will have the problem of generating large heat. Thus, the chip encapsulated by the multi-channel constant current drive circuit is easily damaged. For example, as shown in FIG. 1, a conventional multi-channel constant current drive circuit has three outputs. The resistance value of the resistor RUSET' determines the magnitude of each output. The input voltage of the input terminal of the multi-channel constant current drive circuit is 12V, and each output current is 100 mA. In the case that the load voltage of each output terminal is 6V, the input current of the input terminal of the multi-channel constant current drive circuit is 302 mA. The total power of the multi-channel constant current drive circuit and the load of each output terminal is 302 mA*12V=3.624 W. The total power of the load of each output terminal is 6V*100 mA*3=1.8 W, so that the power of the multi-channel constant current drive circuit is 3.624 W−1.8 W=1.824 W. The ratio of the multi-channel constant current drive circuit to the total power is 50.3%. The power ratio of the multi-channel constant current drive circuit is high.

SUMMARY OF THE INVENTION

The primary object of the present invention is to provide a low power consumption LED constant current drive circuit that provides a multi-channel stable circuit. In addition, the low power consumption LED constant current drive circuit has a low power consumption ratio.

In order to achieve the above object, the present invention adopts the following solutions.

A low power consumption LED constant current drive circuit, comprising a power source input circuit and a multi-channel constant current drive circuit. The power source input circuit includes a common input terminal, a first power source terminal, a second power source terminal, and a power source resistor. Wherein, one end of the first power source terminal and one end of the power source resistor are connected to the common input terminal. Another end of the power source resistor is connected to the second power source terminal. The multi-channel constant current drive circuit includes a constant current source circuit, an output voltage detection circuit, and a reference current control circuit. The constant current source circuit includes N current source circuits each having an identical structure. N is an integer greater than or equal to 2. Each current source circuit includes two current control current sources each having an identical structure. The two current control current sources of each current source circuit are defined as a first current control current source and a second current control current source. The first current control current source has an amplification factor equal to that of the second current control current source. Input terminals of the first current control current source and the second current control current source of each current source circuit are connected to the first power source terminal and the second power source terminal, respectively. An output terminal of the first current control current source is connected to an output terminal of the second current control current source of each current source circuit and serves as an output terminal of each current source circuit. The output voltage detection circuit includes N voltage detection circuits each having an identical structure. Each voltage detection circuit has two input terminals defined as a first input terminal and a second input terminal and an output terminal. Wherein, an ith voltage detection circuit is configured to detect a difference value between the voltage of an output terminal of an ith current source circuit and the voltage of the second power source terminal and output a corresponding ith current signal. A first input terminal of the ith voltage detection circuit is connected to the second power source terminal. A second input terminal of the ith voltage detection circuit is connected to the output terminal of the ith current source circuit. i is any integer from 1 to N. The reference current control circuit includes a total current setting circuit, a first differential voltage circuit, a second differential voltage circuit, and n reference current output circuits each having an identical structure. Each reference current output circuit has two control terminals defined as a first control terminal and a second control terminal, two differential terminals defined as a first differential terminal and a second differential terminal, and two output terminals defined as a first output terminal and a second output terminal. Wherein, the total current setting circuit is connected to the first control terminal of each reference current output circuit. The total current setting circuit is configured to control the sum of the current flowing through the first output terminal and the current flowing through the second output terminal of each reference current output circuit. Wherein, a second control terminal of an ith reference current output circuit is connected to an output terminal of the ith voltage detection circuit. The first differential voltage circuit and the second differential voltage circuit are respectively connected to the first differential terminal and the second differential terminal of each reference current output circuit. The first differential voltage circuit is configured to provide an identical reference voltage signal to the first differential terminal of each reference current output circuit. The second differential voltage circuit is configured to provide an ith voltage signal in response to the ith current signal to a second differential terminal of the ith reference current output circuit according to the ith current signal. The ith reference current output circuit controls the ratio of the current flowing through a first output terminal to the current flowing through a second output terminal of the ith reference current output circuit according to the ith voltage signal. Wherein, the first output terminal and the second output terminal of the ith reference current output circuit are connected to the input terminal of the first current control current source and the input terminal of the second current control current source of the ith current source circuit, respectively.

Preferably, the first current control current source of each current source circuit includes a first resistor, a second resistor, a first PMOS transistor, and a first amplifier. Wherein, one end of the first resistor is connected to one end of the second resistor and serves as the input terminal of the first current control current source. Another end of the first resistor is connected to a non-inverting input terminal of the first amplifier and serves as a control terminal of the first current control current source. An inverting input terminal of the first amplifier is connected to another end of the second resistor and a source of the first PMOS transistor. An output terminal of the first amplifier is connected to a gate of the first PMOS transistor. A drain of the first PMOS transistor serves as the output terminal of the first current control current source. Wherein, the second current control current source of each current source circuit includes a third resistor, a fourth resistor, a second PMOS transistor, and a second amplifier. Wherein, the third resistor has a resistance value equal to that of the first resistor. The fourth resistor has a resistance value equal to that of the second resistor. The second PMOS transistor has a transconductance equal to that of the first PMOS transistor. The second amplifier has an amplification factor equal to that of the first amplifier. Wherein, one end of the third resistor is connected to one end of the fourth resistor and serves as the input terminal of the second current control current source. Another end of the third resistor is connected to a non-inverting input terminal of the second amplifier and serves as a control terminal of the second current control current source. An inverting input terminal of the second amplifier is connected to another end of the fourth resistor and a source of the second PMOS transistor. An output terminal of the second amplifier is connected to a gate of the second PMOS transistor. A drain of the second PMOS transistor serves as the output terminal of the second current control current source.

Preferably, each voltage detection circuit includes a fifth resistor, a sixth resistor, a seventh resistor, a first NMOS transistor, a second NMOS transistor, a third NMOS transistor, a third PMOS transistor, and a first current source. Wherein, one end of the fifth resistor is connected to one end of the sixth resistor and serves as the first input terminal of the voltage detection circuit. Another end of the fifth resistor is connected to a drain of the first NMOS transistor. A gate of the first NMOS transistor serves as the second input terminal of the voltage detection circuit. A source of the first NMOS transistor is connected to a gate of the third PMOS transistor and is grounded through the seventh resistor. Another end of the sixth resistor is connected to a source of the third PMOS transistor. A drain of the third PMOS transistor is connected to a drain of the second NMOS transistor, a gate of the second NMOS transistor and a gate of the third NMOS transistor. A source of the second NMOS transistor is connected to a source of the third NMOS transistor and is grounded. A drain of the third NMOS transistor is connected to an output terminal of the first current source and serves as the output terminal of the voltage detection circuit.

Preferably, the total current setting circuit includes an adjustment resistor, a fourth PMOS transistor, a fourth NMOS transistor, and a third amplifier OP3. Wherein, a source of the fourth PMOS transistor is connected to a DC power source. A gate of the fourth PMOS transistor is connected to a drain of the fourth PMOS transistor and a drain of the fourth NMOS transistor. A non-inverting input terminal of the third amplifier is connected to a reference voltage. An inverting input terminal of the third amplifier is connected to a source of the fourth NMOS transistor and one end of the adjustment resistor. An output terminal of the third amplifier is connected to a gate of the fourth NMOS transistor. Another end of the adjustment resistor is grounded. The gate of the fourth PMOS transistor serves as an output terminal of the total current setting circuit. The output terminal of the total current setting circuit is connected to the first control terminal of each reference current output circuit. The first differential voltage circuit includes an eighth resistor, a fifth NMOS transistor, and a second current source. Wherein, an output terminal of the second current source is connected to one end of the eighth resistor and serves as an output terminal of the first differential voltage circuit. The output terminal of the first differential voltage circuit is connected to the first differential terminal of each reference current output circuit. Another end of the eighth resistor is connected to a drain and a gate of the fifth NMOS transistor. A source of the fifth NMOS transistor is grounded. The second differential voltage circuit includes a ninth resistor and a tenth NMOS transistor. The ninth resistor has a resistance value equal to that of the eighth resistor. The tenth NMOS transistor has a transconductance equal to that of the fifth NMOS transistor. One end of the ninth resistor is connected to a drain of the tenth NMOS transistor and a gate of the tenth NMOS transistor. A source of the tenth NMOS transistor is grounded. Another end of the ninth resistor serves as an output terminal of the second differential voltage circuit. The output terminal of the second differential voltage circuit is connected to the second differential end of each reference current output circuit.

Each reference current output circuit includes a first transistor, a fifth PMOS transistor, a sixth PMOS transistor, a seventh PMOS transistor, a sixth NMOS transistor, a seventh NMOS transistor, an eighth NMOS transistor, and a ninth NMOS transistor. The sixth PMOS transistor has a transconductance equal to that of the seventh PMOS transistor. The sixth NMOS transistor has a transconductance equal to that of the seventh NMOS transistor. The eighth NMOS transistor has a transconductance equal to that of the ninth NMOS transistor. A gate of the fifth PMOS transistor serves as the first control terminal of the reference current output circuit. A source of the fifth PMOS transistor is connected to the DC power source. A drain of the fifth PMOS transistor is connected to a source of the sixth PMOS transistor and a source of the seventh PMOS transistor. A gate of the sixth PMOS transistor serves as the first differential terminal of the reference current output circuit. A drain of the sixth PMOS transistor is connected to a gate of the sixth NMOS transistor, a gate of the seventh NMOS transistor and a drain of the seventh NMOS transistor. A source of the sixth NMOS transistor and a source of the seventh NMOS transistor are grounded. A drain of the sixth NMOS transistor serves as the first output terminal of the reference current output circuit. A drain of the seventh PMOS transistor is connected to a gate of the eighth NMOS transistor, a drain of the eighth NMOS transistor and a gate of the ninth NMOS transistor. A source of the eighth NMOS transistor and a source of the ninth NMOS transistor are grounded. A drain of the ninth NMOS transistor serves as the second output terminal of the reference current output circuit. A gate of the seventh PMOS transistor is connected to an emitter of the first transistor. The gate of the seventh PMOS transistor serves as the second differential terminal of the reference current output circuit. A base of the first transistor is connected to a collector of the first transistor and serves as the second control terminal of the reference current output circuit.

By adopts the above solutions, the present invention can output multiple stable currents. Compared with the existing multi-channel constant current drive circuit, the present invention can share part of the power consumption of the low power consumption LED constant current drive circuit provided by the present invention through the power source resistance, thereby reducing the power consumption ratio of the multi-channel constant current drive circuit of the low power consumption LED constant current drive circuit provided by the present invention. In addition, the present invention can perform feedback adjustment through the output voltage detection circuit and the reference current control circuit to ensure that the current flowing through the output terminal of each current source circuit does not change when the voltage of the common input terminal drops.

DETAILED DESCRIPTION OF THE PREFERRED EMBODIMENTS

Embodiments of the present invention will now be described, by way of example only, with reference to the accompanying drawings.

As shown in FIG. 2 through FIG. 5, the present invention discloses a low power consumption LED constant current drive circuit, comprising a power source input circuit and a multi-channel constant current drive circuit. Wherein, the multi-channel constant current drive circuit includes a constant current source circuit, an output voltage detection circuit, and a reference current control circuit.

Figure 2:
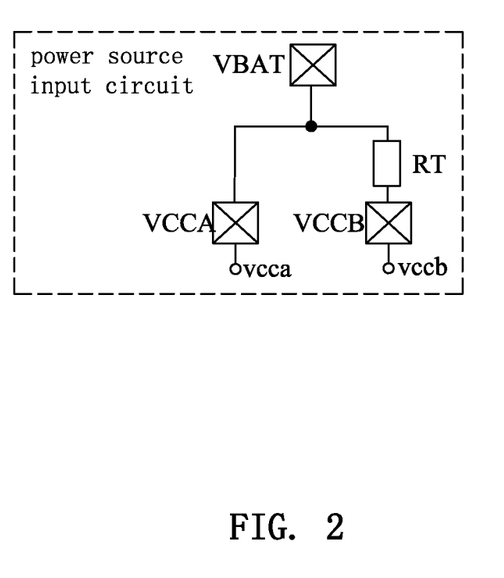
FIG. 2 is a circuit diagram of a power source input circuit of the present invention.

As shown in FIG. 2, the power source input circuit includes a common input terminal VBAT, a first power source terminal VCCA, a second power source terminal VCCB, and a power source resistor RT. Wherein, one end of the first power source terminal VCCA and one end of the power source resistor RT are connected to the common input terminal VBAT. Another end of the power source resistor RT is connected to the second power source terminal VCCB.

Figure 3:
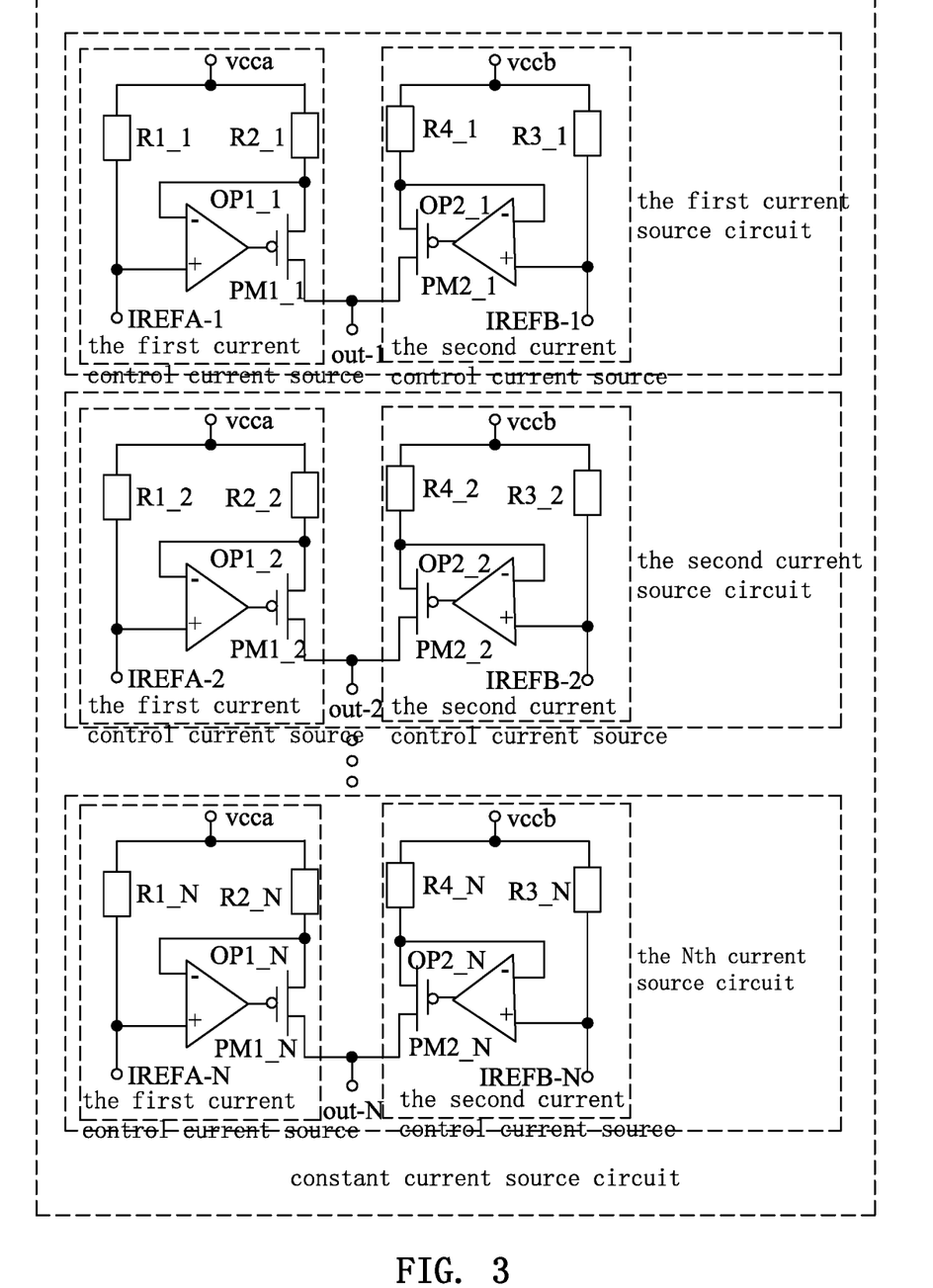
FIG. 3 is a circuit diagram of a constant current source circuit of the present invention.

As shown in FIG. 2 and FIG. 3, the constant current source circuit includes N current source circuits each having an identical structure. N is an integer greater than or equal to 2. Each current source circuit includes two current control current sources each having an identical structure. The two current control current sources of each current source circuit are defined as a first current control current source and a second current control current source. Input terminals of the first current control current source and the second current control current source of each current source circuit are respectively connected to the first power source terminal VCCA and the second power source terminal VCCB. An output terminal of the first current control current source is connected to an output terminal of the second current control current source of each current source circuit and serves as an output terminal of each current source circuit. In this way, the current flowing through the output terminal of each current source circuit is equal to the sum of the current flowing through the output terminal of the first current control current source and the current flowing through the output terminal of the second current control current source. The current flowing through the output terminal of the first current control current source is equal to M times the current flowing through the control terminal of the first current control current source. The current flowing through the output terminal of the second current control current source is equal to M times the current flowing through the control terminal of the second current control current source. M is an amplification factor of the first current control current source and the second current control current source, that is, the amplification factor of the first current control current source is equal to the amplification factor of the second current control current source. Therefore, it can be known that the current flowing through the output terminal of each current source circuit is equal to M times the sum of the current flowing through the control terminal of the first current control and the current flowing through the output terminal of the second current control current source.

Figure 4:
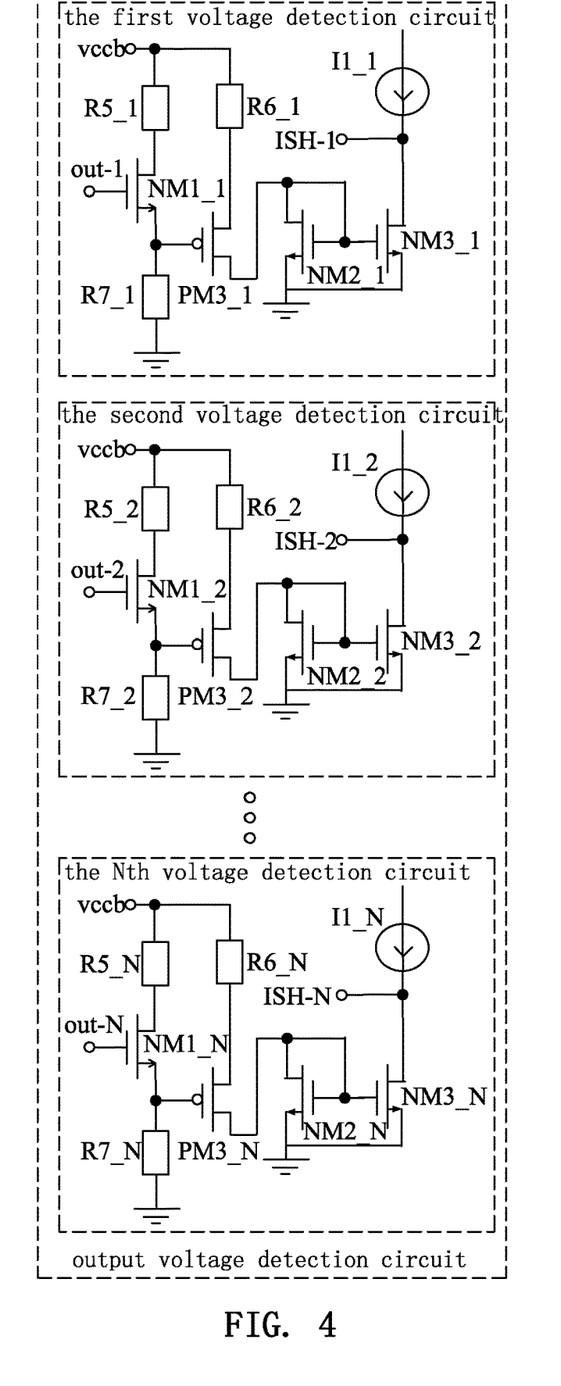
FIG. 4 is a circuit diagram of an output voltage detection circuit of the present invention.

As shown in FIG. 2 through FIG. 4, the output voltage detection circuit includes N voltage detection circuits each having an identical structure. Each voltage detection circuit has two input terminals defined as a first input terminal and a second input terminal and an output terminal. Wherein, the ith voltage detection circuit is configured to detect the difference value between the voltage of the output terminal of the ith current source circuit and the voltage of the second power source terminal VCCB and output a corresponding ith current signal. The first input terminal of the ith voltage detection circuit is connected to the second power source terminal VCCB. The second input terminal of the ith voltage detection circuit is connected to the output terminal of the ith current source circuit. i is any integer from 1 to N.

As shown in FIG. 2 through FIG. 5, the reference current control circuit includes a total current setting circuit, a first differential voltage circuit, a second differential voltage circuit, and n reference current output circuits each having an identical structure. Each reference current output circuit has two control terminals defined as a first control terminal and a second control terminal, two differential terminals defined as a first differential terminal and a second differential terminal, and two output terminals defined as a first output terminal and a second output terminal. The total current setting circuit is connected to the first control terminal of each reference current output circuit. The total current setting circuit is configured to control the sum of the current flowing through the first output terminal and the current flowing through the second output terminal of each reference current output circuit. Because the sum of the current flowing through the first output terminal and the current flowing through the second output terminal of each reference current output circuit is controlled by the total current setting circuit, the sum of the currents of the first output terminals is equal to the currents of the second output terminals of the reference current output circuits. The first output terminal and the second output terminal of the ith reference current output circuit are respectively connected to the input terminal of the first current control current source and the input terminal of the second current control current source of the ith current source circuit, so that the currents flowing through the output terminals of the current source circuits are equal, thereby realizing a multi-channel constant current output. The second control terminal of the ith reference current output circuit is connected to the output terminal of the ith voltage detection circuit. The first differential voltage circuit and the second differential voltage circuit are respectively connected to the first differential terminal and the second differential terminal of each reference current output circuit. The first differential voltage circuit is configured to provide an identical reference voltage signal to the first differential terminal of each reference current output circuit. The second differential voltage circuit is configured to provide the ith voltage signal in response to the magnitude of the ith current signal to the second differential terminal of the ith reference current output circuit according to the ith current signal. The ith reference current output circuit controls the ratio of the current flowing through the first output terminal to the current flowing through the second output terminal of the ith reference current output circuit according to the ith voltage signal. In this way, when the voltage of the common input terminal VBAT decreases, each voltage detection circuit will cause the current flowing through the first output terminal of each reference current output circuit to increase and the current flowing through the second output terminal of each reference current output circuit to decrease, so that the current flowing through the control terminal of the first current control current source of each current source circuit increases and the current flowing through the control terminal of the second current control current source of each current source circuit decreases. Furthermore, the current flowing through the input terminal of the first current control current source of each current source circuit increases and the current flowing through the input terminal of the second current control current source of each current source circuit decreases, so as to reduce the current flowing through the power source resistor RT, thereby reducing the power consumption of the power source resistor RT and keeping the current flowing through the output terminal of each current source circuit unchanged.

As shown in FIG. 3, the first current control current source of each current source circuit includes a first resistor R1_N, a second resistor R2_N, a first PMOS transistor PM1_N, and a first amplifier OP1_N. Wherein, one end of the first resistor R1_N is connected to one end of the second resistor R2_N and serves as the input terminal of the first current control current source. Another end of the first resistor R1_N is connected to a non-inverting input terminal of the first amplifier OP1_N and serves as the control terminal of the first current control current source. An inverting input terminal of the first amplifier OP1_N is connected to another end of the second resistor R2_N and a source of the first PMOS transistor PM1_N. An output terminal of the first amplifier OP1_N is connected to a gate of the first PMOS transistor PM1_N. A drain of the first PMOS transistor PM1_N serves as the output terminal of the first current control current source. Wherein, the amplification factor of the first current control current source is equal to the resistance value of the first resistor R1_N divided by the resistance value of the second resistor R2_N. The working principle of the first current control current source is described below. The first amplifier OP1_N amplifies the differential voltage signal at its positive and negative input terminals. Through the negative feedback of the first PMOS transistor PM1_N to the loop of the first current control current source, the loop of the first current control current source is in a balanced state, so that the voltages of the positive and negative input terminals of the first amplifier OP1_N are approximately equal. Thus, the voltage across the first resistor R1_N is approximately equal to the voltage across the second resistor R2_N. According to Ohm's law, when the voltage across the first resistor R1_N is equal to the voltage across the second resistor R2_N, the ratio of the current of the first resistor R1_N to the current of the second resistor R2_N and the ratio of the resistance value of the first resistor R1_N to the resistance value of the second resistor R2_N are inversely proportional. The current of the second resistor R2_N is M times the current of the first resistor R1_N. M is equal to the resistance value of the first resistor R1_N divided by the resistance value of the second resistor R2_N. The current of the second resistor R2_N is the output current of the first current control current source. The current of the first resistor R1_N is the current flowing through the control terminal of the first current control current source. The second current control current source of each current source circuit includes a third resistor R3_N, a fourth resistor R4_N, a second PMOS transistor PM2_N, and a second amplifier OP2_N. The resistance value of the third resistor R3_N is equal to the resistance value of the first resistor R1_N. The resistance value of the fourth resistor R4_N is equal to the resistance value of the second resistor R2_N. The transconductance of the second PMOS transistor PM2_N is equal to the transconductance of the first PMOS transistor PM1_N. The amplification factor of the second amplifier OP2_N is equal to the amplification factor of the first amplifier OP1_N. Wherein, one end of the third resistor R3_N is connected to one end of the fourth resistor R4_N and serves as the input terminal of the second current control current source. Another end of the third resistor R3_N is connected to a non-inverting input terminal of the second amplifier OP2_N and serves as the control terminal of the second current control current source. An inverting input terminal of the second amplifier OP2_N is connected to another end of the fourth resistor R4_N and a source of the second PMOS transistor PM2_N. An output terminal of the second amplifier OP2_N is connected to a gate of the second PMOS transistor PM2_N. A drain of the second PMOS transistor PM2_N serves as the output terminal of the second current control current source. Wherein, the amplification factor of the second current control current source is equal to the resistance value of the third resistor R3_N divided by the resistance value of the fourth resistor R4_N. The working principle of the second current control current source is described below. The second amplifier OP2_N amplifies the differential voltage signal at its positive and negative input terminals. Through the negative feedback of the second PMOS transistor PM2_N to the loop of the second current control current source, the loop of the second current control current source is in a balanced state, so that the voltages of the positive and negative input terminals of the second amplifier OP2_N are approximately equal. Thus, the voltage across the third resistor R3_N is approximately equal to the voltage across the fourth resistor R4_N. According to Ohm's law, when the voltage across the third resistor R3_N is equal to the voltage across the fourth resistor R4_N, the ratio of the current of the third resistor R3_N to the current of the fourth resistor R4_N and the ratio of the resistance value of the third resistor R3_N to the resistance value of the fourth resistor R4_N are inversely proportional. The current of the fourth resistor R4_N is M times the current of the third resistor R3_N. M is equal to the resistance value of the third resistor R3_N divided by the resistance value of the fourth resistor R4_N. The current of the fourth resistor R4_N is the output current of the second current control current source. The current of the third resistor R3_N is the current flowing through the control terminal of the second current control current source.

As shown in FIG. 4, each voltage detection circuit includes a fifth resistor R5_N, a sixth resistor R6_N, a seventh resistor R7_N, a first NMOS transistor NM1_N, a second NMOS transistor NM2_N, a third NMOS transistor NM3_N, a third PMOS transistor PM3_N and a first current source I1_N. Wherein, one end of the fifth resistor R5_N is connected to one end of the sixth resistor R6_N and serves as the first input terminal of the voltage detection circuit. Another end of the fifth resistor R5_N is connected to a drain of the first NMOS transistor NM1_N. A gate of the first NMOS transistor NM1_N serves as the second input terminal of the voltage detection circuit. A source of the first NMOS transistor NM1_N is connected to a gate of the third PMOS transistor PM3_N and is grounded through the seventh resistor R7_N. Another end of the sixth resistor R6_N is connected to a source of the third PMOS transistor PM3_N. A drain of the third PMOS transistor PM3_N is connected to a drain of the second NMOS transistor NM2_N, a gate of the second NMOS transistor NM2_N, and a gate of the third NMOS transistor NM3_N. A source of the second NMOS transistor NM2_N is connected to a source of the third NMOS transistor NM3_N and is grounded. A drain of the third NMOS transistor NM3_N is connected to an output terminal of the first current source I1_N and serves as the output terminal of the voltage detection circuit. Wherein, the second NMOS transistor NM2_N and the third NMOS transistor NM3_N form a current leakage circuit structure. When the voltage detection circuit is working, the first NMOS transistor NM1_N and the third PMOS transistor PM3_N work in a deep linear region. The width-to-length ratio of the first NMOS transistor NM1_N to the third PMOS transistor PM3_N may be large enough, so that the resistance value of the seventh resistor R7_N may be large enough. For example, the width-to-length ratio of the first NMOS transistor NM1_N to the third PMOS transistor PM3_N is 20, and the resistance value of the seventh resistor R7_N is 2 megohms. This ensures that the first NMOS transistor NM1_N and the third PMOS transistor PM3_N work in a deep linear region. Wherein, the principle of the Nth voltage detection circuit is described below. The first NMOS transistor NM1_N and the third PMOS transistor PM3_N work in a deep linear region. The voltage of the sixth resistor R6_N of the Nth voltage detection circuit is $V_{r6} \approx V_{VCCB} - (V_{OUT-N} - V_{THN} + V_{THP})$. Wherein, $V_{VCCB}$ is the voltage of the first input terminal of the Nth voltage detection circuit (that is, the voltage at the second power source terminal VCCB), and $V_{OUT-N}$ is the voltage of the second input terminal of the Nth voltage detection circuit (that is, the voltage of the input terminal of the Nth current source circuit), $V_{THN}$ is the threshold voltage of the first NMOS transistor NM1_N, $V_{THP}$ is the threshold voltage of the third PMOS transistor PM3_N, and the current of the sixth resistor R6_N is $I_{r6}=V_{r6}/r6$. r6 is the resistance value of the sixth resistor R6_N. The current of the second NMOS transistor NM2_N is equal to the current $I_{r6}$ of the sixth resistor R6_N. The current of the third NMOS transistor NM3_N mirrors the current of the second NMOS transistor NM2_N, so the current flowing through the output terminal of the Nth voltage detection circuit is ISH-N=I1_N−(V$_6$/r6). In this way, the voltage $V_{OUT-N}$ of the second input terminal of the Nth voltage detection circuit is much lower than the voltage VVcC$_B$ of the first input terminal of the Nth voltage detection circuit. VR6/R6 is larger. The current ISH-N flowing through the output terminal of the Nth voltage detection circuit is close to 0 mA, that is, the Nth current signal is close to 0 mA. When the voltage $V_{OUT-N}$ of the second input terminal of the Nth voltage detection circuit increases and is close to the voltage $V_{VCCB}$ of the first input terminal of the Nth voltage detection circuit, the current ISH-N flowing through the output terminal of the Nth voltage detection circuit is larger, that is, the Nth current signal is larger. Therefore, the magnitude of the Nth current signal is in response to the difference value between the voltage of the output terminal of the Nth current source circuit and the voltage of the second power source terminal.

Figure 5:
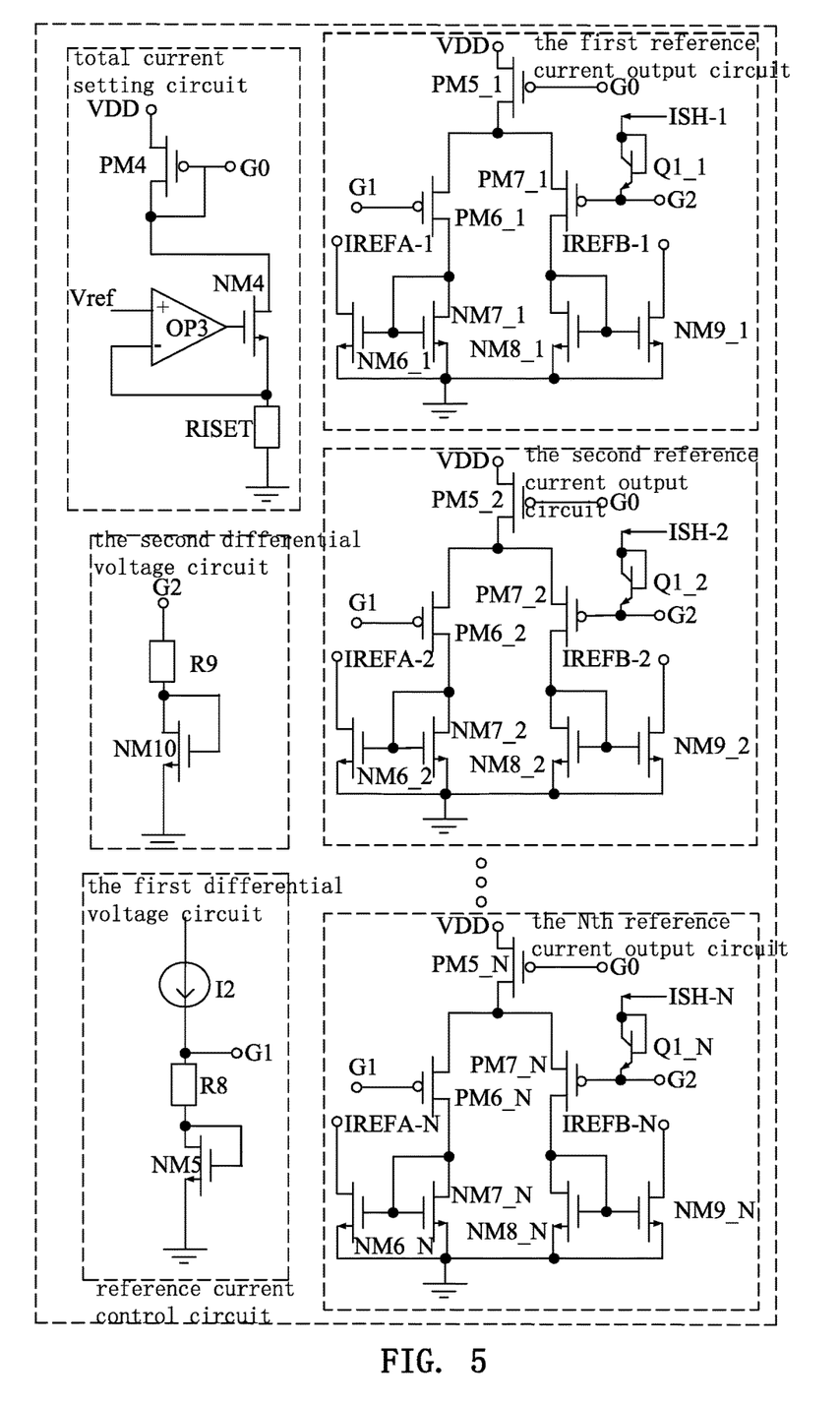
FIG. 5 is a circuit diagram of a reference current control circuit of the present invention.

As shown in FIG. 5, the total current setting circuit includes an adjustment resistor RISET, a fourth PMOS transistor PM4, a fourth NMOS transistor NM4, and a third amplifier OP3. Wherein, a source of the fourth PMOS transistor PM4 is connected to a DC power source VDD. A gate of the fourth PMOS transistor PM4 is connected to a drain of the fourth PMOS transistor PM4 and a drain of the fourth NMOS transistor NM4. A non-inverting input terminal of the third amplifier OP3 is connected to a reference voltage Vref. An inverting input terminal of the third amplifier OP3 is connected to a source of the fourth NMOS transistor NM4 and one end of the adjustment resistor RISET. An output terminal of the third amplifier OP3 is connected to a gate of the fourth NMOS transistor NM4. Another end of the adjustment resistor RISET is grounded. The gate of the fourth PMOS transistor PM4 serves as an output terminal of the total current setting circuit. The output terminal of the total current setting circuit is connected to the first control terminal of each reference current output circuit. The first differential voltage circuit includes an eighth resistor R8, a fifth NMOS transistor NM5, and a second current source I2. Wherein, an output terminal of the second current source I2 is connected to one end of the eighth resistor R8 and serves as an output terminal of the first differential voltage circuit. The output terminal of the first differential voltage circuit is connected to the first differential terminal of each reference current output circuit. Another end of the eighth resistor R8 is connected to a drain and a gate of the fifth NMOS transistor NM5. A source of the fifth NMOS transistor NM5 is grounded. The second differential voltage circuit includes a ninth resistor R9 and a tenth NMOS transistor NM10. Wherein, the resistance value of the ninth resistor R9 is equal to the resistance value of the eighth resistor R8. The transconductance of the tenth NMOS transistor NM10 is equal to the transconductance of the fifth NMOS transistor NM5. One end of the ninth resistor R9 is connected to a drain of the tenth NMOS transistor NM10 and a gate of the tenth NMOS transistor NM10. A source of the tenth NMOS transistor NM10 is grounded. Another end of the ninth resistor R9 serves as an output terminal of the second differential voltage circuit. The output terminal of the second differential voltage circuit is connected to the second differential end of each reference current output circuit. Each reference current output circuit includes a first transistor Q1_N, a fifth PMOS transistor PM5_N, a sixth PMOS transistor PM6_N, a seventh PMOS transistor PM7_N, a sixth NMOS transistor NM6_N, a seventh NMOS transistor NM7_N, an eighth NMOS transistor NM8_N, and a ninth NMOS transistor NM9_N. Wherein, the transconductance of the sixth PMOS transistor PM6_N is equal to the transconductance of the seventh PMOS transistor PM7_N. The transconductance of the sixth NMOS transistor NM6_N is equal to the transconductance of the seventh NMOS transistor NM7_N. The transconductance of the eighth NMOS transistor NM8_N is equal to the transconductance of the ninth NMOS transistor NM9_N. A gate of the fifth PMOS transistor PM5_N serves as the first control terminal of the reference current output circuit. A source of the fifth PMOS transistor PM5_N is connected to the DC power source VDD. A drain of the fifth PMOS transistor PM5_N is connected to a source of the sixth PMOS transistor PM6_N and a source of the seventh PMOS transistor PM7_N. A gate of the sixth PMOS transistor PM6_N serves as the first differential terminal of the reference current output circuit. A drain of the sixth PMOS transistor PM6_N is connected to a gate of the sixth NMOS transistor NM6_N, a gate of the seventh NMOS transistor NM7_N, and a drain of the seventh NMOS transistor NM7_N. A source of the sixth NMOS transistor NM6_N and a source of the seventh NMOS transistor NM7_N are grounded. A drain of the sixth NMOS transistor NM6_N serves as the first output terminal of the reference current output circuit. A drain of the seventh PMOS transistor PM7_N is connected to a gate of the eighth NMOS transistor NM8_N, a drain of the eighth NMOS transistor NM8_N and a gate of the ninth NMOS transistor NM9_N. A source of the eighth NMOS transistor NM8_N and a source of the ninth NMOS transistor NM9_N are grounded. A drain of the ninth NMOS transistor NM9_N serves as the second output terminal of the reference current output circuit. A gate of the seventh PMOS transistor PM7_N is connected to an emitter of the first transistor Q1_N. The gate of the seventh PMOS transistor PM7_N serves as the second differential terminal of the reference current output circuit. A base of the first transistor Q1_N is connected to a collector of the first transistor Q1_N and serves as the second control terminal of the reference current output circuit.

In order to facilitate the understanding of the working principle of the reference current control circuit, the following introduces the working principle of the reference current control circuit. In the total current setting circuit, the fourth PMOS transistor PM4, the fourth NMOS transistor NM4 and the third amplifier OP3 form a negative feedback loop. The positive and negative inputs of the third amplifier OP3 have an amplification effect on its differential voltage signal. One end of the adjustment resistor RISET is connected to the negative input terminal of the third amplifier OP3. When the negative feedback loop is in a balanced state, the voltages of the positive and negative input terminals of the third amplifier OP3 are almost equal, the current $I_0$ of the adjustment resistor RISET is approximately $V_{Vref}/R_0$, $V_{Vref}$ is the voltage value of the reference voltage Vref, and $R_0$ is the resistance value of the adjustment resistor RISET. The channel current of the fourth PMOS transistor PMOS4 is equal to the current $I_0$ of the adjustment resistor RISET. The fifth PMOS transistor PMOS5_N of each reference current output circuit mirrors the current of the fourth PMOS transistor PMOS4, so the current of the fifth PMOS transistor PMOS5_N of each reference current output circuit is equivalent to the current $I_0$ of the adjustment resistor RISET. In each reference current output circuit, the sixth NMOS transistor NM6_N and the ninth NMOS transistor NM9_N mirror the currents of the seventh NMOS transistor NM7_N and the eighth NMOS transistor NM8_N, respectively. The sixth PMOS transistor PMOS6_N and the seventh PMOS transistor PMOS7_N form a pair of differential transistors. The magnitude of the current of the fifth PMOS transistor PMOS5_N determines the sum of the current flowing through the first output terminal and the current flowing through the second output terminal of the reference current output circuit. Since the ith current signal output from the ith voltage detection circuit acts on the gate of the seventh PMOS transistor PMOS7_N of the ith reference current output circuit, the larger the ith current signal, the higher the voltage of the gate of the seventh PMOS transistor PMOS7_N of the ith reference current output circuit through the second differential circuit. The smaller the channel current of the seventh PMOS transistor PMOS7_N of the ith reference current output circuit, the larger the current flowing through the first output terminal of the ith reference current output circuit, and the smaller the current flowing through the second output terminal of the ith reference current output circuit, the greater the current flowing through the control terminal of the first current control current source of the corresponding ith current source circuit, and the smaller the current flowing through the control terminal of the first current control current source of the corresponding ith current source circuit. It can be seen from the above that when the voltage value of the reference voltage Vref is unchanged, the resistance value of the adjustment resistor RISET determines the current of the fifth PMOS transistor PM5_N of each reference current output circuit. The current of the fifth PMOS transistor PM5_N determines the sum of the current flowing through the first output terminal and the current flowing through the second output terminal of each reference current output circuit. The sum of the current flowing through the first output terminal and the current flowing through the second output terminal of each reference current output circuit determines the current flowing through the output terminal of each current source circuit. Therefore, the resistance value of the adjustment resistor RISET determines the current flowing through the output terminal of each current source circuit. By controlling the resistance value of the adjustment resistor RISET, the current flowing through the output terminal of each current source circuit can be controlled. The ith current signal controls the ratio of the current flowing through the first output terminal to the current flowing through the second output terminal of the ith reference current output circuit.

When the low power consumption LED constant current drive circuit provided by the present invention has an input voltage of 12V at the total input terminal (that is, the voltage of the common input terminal VBAT) and has three constant current outputs, that is, N=3, in cooperation with FIG. 1 and FIG. 2, compared with the existing multi-channel constant current drive circuit, the total input current (that is, the input current of the common input terminal VBAT) of the low power consumption LED constant current drive circuit provided by the present invention is also 302 mA in the case that the output current of each circuit is also 100 mA and the load voltage of each output terminal is 6 V. That is, the low power consumption LED constant current drive circuit provided by the present invention has the same power consumption as the existing multi-channel constant current drive circuit. In this way, the present invention can share part of the power consumption of the low power consumption LED constant current drive circuit provided by the present invention through the power source resistance RT, thereby reducing the power consumption ratio of the multi-channel constant current drive circuit.

In summary, the present invention can output multiple stable currents. Compared with the existing multi-channel constant current drive circuit, the present invention can share part of the power consumption of the low power consumption LED constant current drive circuit provided by the present invention through the power source resistance RT, thereby reducing the power consumption ratio of the multi-channel constant current drive circuit of the low power consumption LED constant current drive circuit provided by the present invention. In addition, the present invention can perform feedback adjustment through the output voltage detection circuit and the reference current control circuit to ensure that the current flowing through the output terminal of each current source circuit does not change when the voltage of the common input terminal drops.

What is claimed is:

1. A low power consumption LED constant current drive circuit, comprising a power source input circuit and a multi-channel constant current drive circuit;

the power source input circuit including a common input terminal, a first power source terminal, a second power source terminal, and a power source resistor, wherein one end of the first power source terminal and one end of the power source resistor are connected to the common input terminal, another end of the power source resistor is connected to the second power source terminal;

the multi-channel constant current drive circuit including a constant current source circuit, an output voltage detection circuit, and a reference current control circuit;

the constant current source circuit including N current source circuits each having an identical structure, N being an integer greater than or equal to 2;

each current source circuit including two current control current sources each having an identical structure, the two current control current sources of each current source circuit being defined as a first current control current source and a second current control current source, the first current control current source having an amplification factor equal to that of the second current control current source, input terminals of the first current control current source and the second current control current source of each current source circuit being connected to the first power source terminal and the second power source terminal, respectively; an output terminal of the first current control current source being connected to an output terminal of the second current control current source of each current source circuit and serving as an output terminal of each current source circuit;

the output voltage detection circuit including N voltage detection circuits each having an identical structure; each voltage detection circuit having two input terminals defined as a first input terminal and a second input terminal and an output terminal; wherein an ith voltage detection circuit is configured to detect a difference value between the voltage of an output terminal of an ith current source circuit and the voltage of the second power source terminal and output a corresponding ith current signal; a first input terminal of the ith voltage detection circuit is connected to the second power source terminal, a second input terminal of the ith voltage detection circuit is connected to the output terminal of the ith current source circuit; i is any integer from 1 to N;

the reference current control circuit including a total current setting circuit, a first differential voltage circuit, a second differential voltage circuit, and n reference current output circuits each having an identical structure;

each reference current output circuit having two control terminals defined as a first control terminal and a second control terminal, two differential terminals defined as a first differential terminal and a second differential terminal, and two output terminals defined as a first output terminal and a second output terminal;

wherein the total current setting circuit is connected to the first control terminal of each reference current output circuit, the total current setting circuit is configured to control the sum of the current flowing through the first output terminal and the current flowing through the second output terminal of each reference current output circuit;

wherein a second control terminal of an ith reference current output circuit is connected to an output terminal of the ith voltage detection circuit; the first differential voltage circuit and the second differential voltage circuit are respectively connected to the first differential terminal and the second differential terminal of each reference current output circuit, the first differential voltage circuit is configured to provide an identical reference voltage signal to the first differential terminal of each reference current output circuit, the second differential voltage circuit is configured to provide an ith voltage signal in response to the ith current signal to a second differential terminal of the ith reference current output circuit according to the ith current signal; the ith reference current output circuit controls the ratio of the current flowing through a first output terminal to the current flowing through a second output terminal of the ith reference current output circuit according to the ith voltage signal;

wherein the first output terminal and the second output terminal of the ith reference current output circuit are connected to the input terminal of the first current control current source and the input terminal of the second current control current source of the ith current source circuit, respectively.

2. The low power consumption LED constant current drive circuit as claimed in claim 1, wherein the first current control current source of each current source circuit includes a first resistor, a second resistor, a first PMOS transistor, and a first amplifier; wherein one end of the first resistor is connected to one end of the second resistor and serves as the input terminal of the first current control current source, another end of the first resistor is connected to a non-inverting input terminal of the first amplifier and serves as a control terminal of the first current control current source, an inverting input terminal of the first amplifier is connected to another end of the second resistor and a source of the first PMOS transistor, an output terminal of the first amplifier is connected to a gate of the first PMOS transistor, a drain of the first PMOS transistor serves as the output terminal of the first current control current source;

wherein the second current control current source of each current source circuit includes a third resistor, a fourth resistor, a second PMOS transistor, and a second amplifier; wherein the third resistor has a resistance value equal to that of the first resistor, the fourth resistor has a resistance value equal to that of the second resistor, the second PMOS transistor has a transconductance equal to that of the first PMOS transistor, the second amplifier has an amplification factor equal to that of the first amplifier;

wherein one end of the third resistor is connected to one end of the fourth resistor and serves as the input terminal of the second current control current source, another end of the third resistor is connected to a non-inverting input terminal of the second amplifier and serves as a control terminal of the second current control current source, an inverting input terminal of the second amplifier is connected to another end of the fourth resistor and a source of the second PMOS transistor, an output terminal of the second amplifier is connected to a gate of the second PMOS transistor, a drain of the second PMOS transistor serves as the output terminal of the second current control current source.

3. The low power consumption LED constant current drive circuit as claimed in claim 2, wherein each voltage detection circuit includes a fifth resistor, a sixth resistor, a seventh resistor, a first NMOS transistor, a second NMOS transistor, a third NMOS transistor, a third PMOS transistor, and a first current source; wherein one end of the fifth resistor is connected to one end of the sixth resistor and serves as the first input terminal of the voltage detection circuit, another end of the fifth resistor is connected to a drain of the first NMOS transistor, a gate of the first NMOS transistor serves as the second input terminal of the voltage detection circuit, a source of the first NMOS transistor is connected to a gate of the third PMOS transistor and is grounded through the seventh resistor, another end of the sixth resistor is connected to a source of the third PMOS transistor, a drain of the third PMOS transistor is connected to a drain of the second NMOS transistor, a gate of the second NMOS transistor and a gate of the third NMOS transistor, a source of the second NMOS transistor is connected to a source of the third NMOS transistor and is grounded, a drain of the third NMOS transistor is connected to an output terminal of the first current source and serves as the output terminal of the voltage detection circuit.

4. The low power consumption LED constant current drive circuit as claimed in claim 2, wherein the total current setting circuit includes an adjustment resistor, a fourth PMOS transistor, a fourth NMOS transistor, and a third amplifier OP3; wherein a source of the fourth PMOS transistor is connected to a DC power source, a gate of the fourth PMOS transistor is connected to a drain of the fourth PMOS transistor and a drain of the fourth NMOS transistor, a non-inverting input terminal of the third amplifier is connected to a reference voltage, an inverting input terminal of the third amplifier is connected to a source of the fourth NMOS transistor and one end of the adjustment resistor, an output terminal of the third amplifier is connected to a gate of the fourth NMOS transistor, another end of the adjustment resistor is grounded, the gate of the fourth PMOS transistor serves as an output terminal of the total current setting circuit, the output terminal of the total current setting circuit is connected to the first control terminal of each reference current output circuit;

wherein the first differential voltage circuit includes an eighth resistor, a fifth NMOS transistor, and a second current source; wherein an output terminal of the second current source is connected to one end of the eighth resistor and serves as an output terminal of the first differential voltage circuit, the output terminal of the first differential voltage circuit is connected to the first differential terminal of each reference current output circuit; another end of the eighth resistor is connected to a drain and a gate of the fifth NMOS transistor, a source of the fifth NMOS transistor is grounded;

wherein the second differential voltage circuit includes a ninth resistor and a tenth NMOS transistor; wherein, the ninth resistor has a resistance value equal to that of the eighth resistor, the tenth NMOS transistor has a transconductance equal to that of the fifth NMOS transistor; one end of the ninth resistor is connected to a drain of the tenth NMOS transistor and a gate of the tenth NMOS transistor, a source of the tenth NMOS transistor is grounded, another end of the ninth resistor serves as an output terminal of the second differential voltage circuit, the output terminal of the second differential voltage circuit is connected to the second differential end of each reference current output circuit;

wherein each reference current output circuit includes a first transistor, a fifth PMOS transistor, a sixth PMOS transistor, a seventh PMOS transistor, a sixth NMOS transistor, a seventh NMOS transistor, an eighth NMOS transistor, and a ninth NMOS transistor; wherein the sixth PMOS transistor has a transconductance equal to that of the seventh PMOS transistor, the sixth NMOS transistor has a transconductance equal to that of the seventh NMOS transistor, the eighth NMOS transistor has a transconductance equal to that of the ninth NMOS transistor; a gate of the fifth PMOS transistor serves as the first control terminal of the reference current output circuit, a source of the fifth PMOS transistor is connected to the DC power source, a drain of the fifth PMOS transistor is connected to a source of the sixth PMOS transistor and a source of the seventh PMOS transistor, a gate of the sixth PMOS transistor serves as the first differential terminal of the reference current output circuit, a drain of the sixth PMOS transistor is connected to a gate of the sixth NMOS transistor, a gate of the seventh NMOS transistor and a drain of the seventh NMOS transistor, a source of the sixth NMOS transistor and a source of the seventh NMOS transistor are grounded; a drain of the sixth NMOS transistor serves as the first output terminal of the reference current output circuit, a drain of the seventh PMOS transistor is connected to a gate of the eighth NMOS transistor, a drain of the eighth NMOS transistor and a gate of the ninth NMOS transistor, a source of the eighth NMOS transistor and a source of the ninth NMOS transistor are grounded, a drain of the ninth NMOS transistor serves as the second output terminal of the reference current output circuit, a gate of the seventh PMOS transistor is connected to an emitter of the first transistor, the gate of the seventh PMOS transistor serves as the second differential terminal of the reference current output circuit, a base of the first transistor is connected to a collector of the first transistor and serves as the second control terminal of the reference current output circuit.

5. The low power consumption LED constant current drive circuit as claimed in claim 1, wherein each voltage detection circuit includes a fifth resistor, a sixth resistor, a seventh resistor, a first NMOS transistor, a second NMOS transistor, a third NMOS transistor, a third PMOS transistor, and a first current source; wherein one end of the fifth resistor is connected to one end of the sixth resistor and serves as the first input terminal of the voltage detection circuit, another end of the fifth resistor is connected to a drain of the first NMOS transistor, a gate of the first NMOS transistor serves as the second input terminal of the voltage detection circuit, a source of the first NMOS transistor is connected to a gate of the third PMOS transistor and is grounded through the seventh resistor, another end of the sixth resistor is connected to a source of the third PMOS transistor, a drain of the third PMOS transistor is connected to a drain of the second NMOS transistor, a gate of the second NMOS transistor and a gate of the third NMOS transistor, a source of the second NMOS transistor is connected to a source of the third NMOS transistor and is grounded, a drain of the third NMOS transistor is connected to an output terminal of the first current source and serves as the output terminal of the voltage detection circuit.

* * * * *